Nov. 18, 1958   R. D. GROVER ET AL   2,860,735
POWER ACTUATED BRAKE OPERATING MECHANISM
Filed May 11, 1954   4 Sheets-Sheet 1
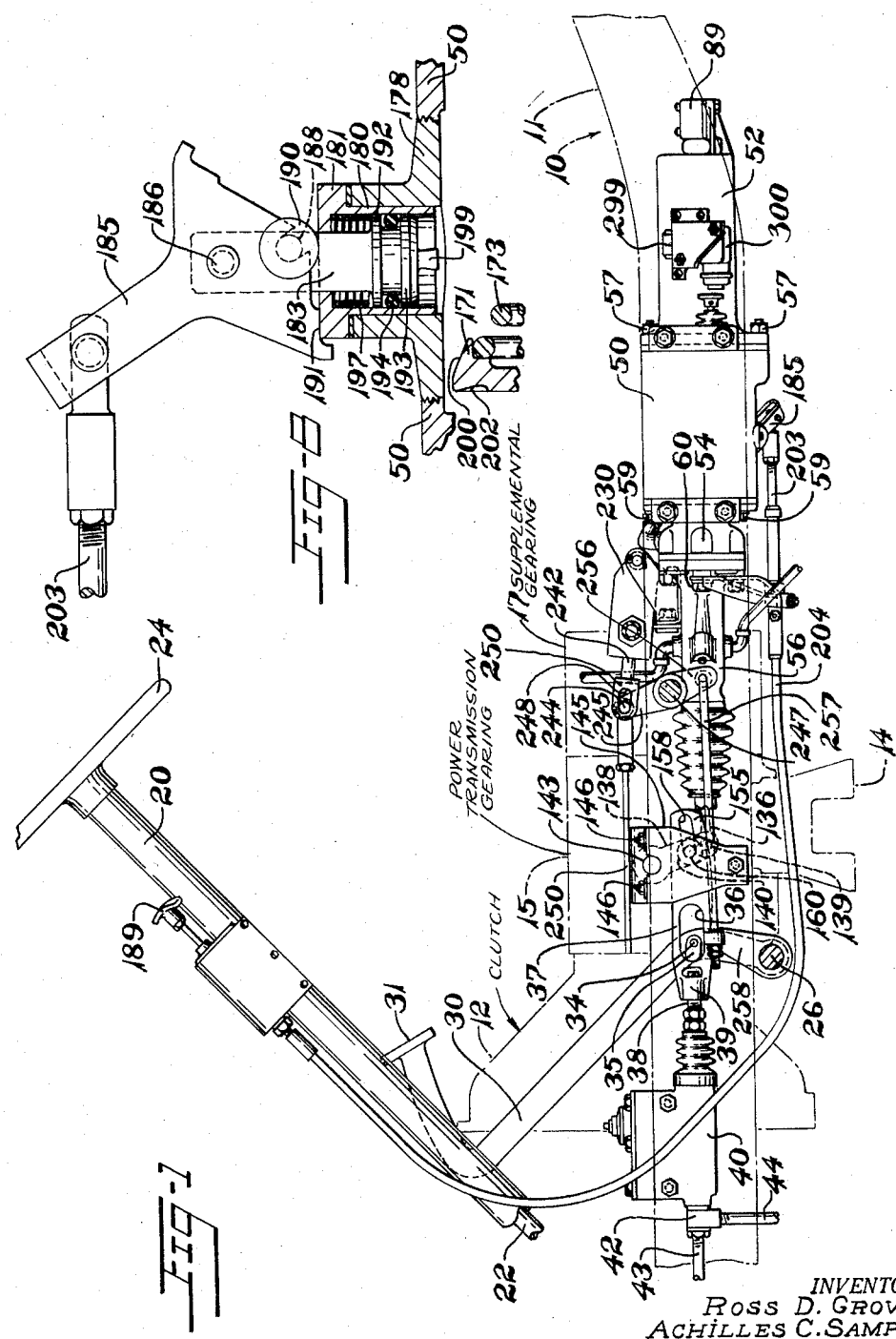
INVENTORS
Ross D. Grover
Achilles C. Sampietro
BY
Harry O. Ernsberger
ATTY.

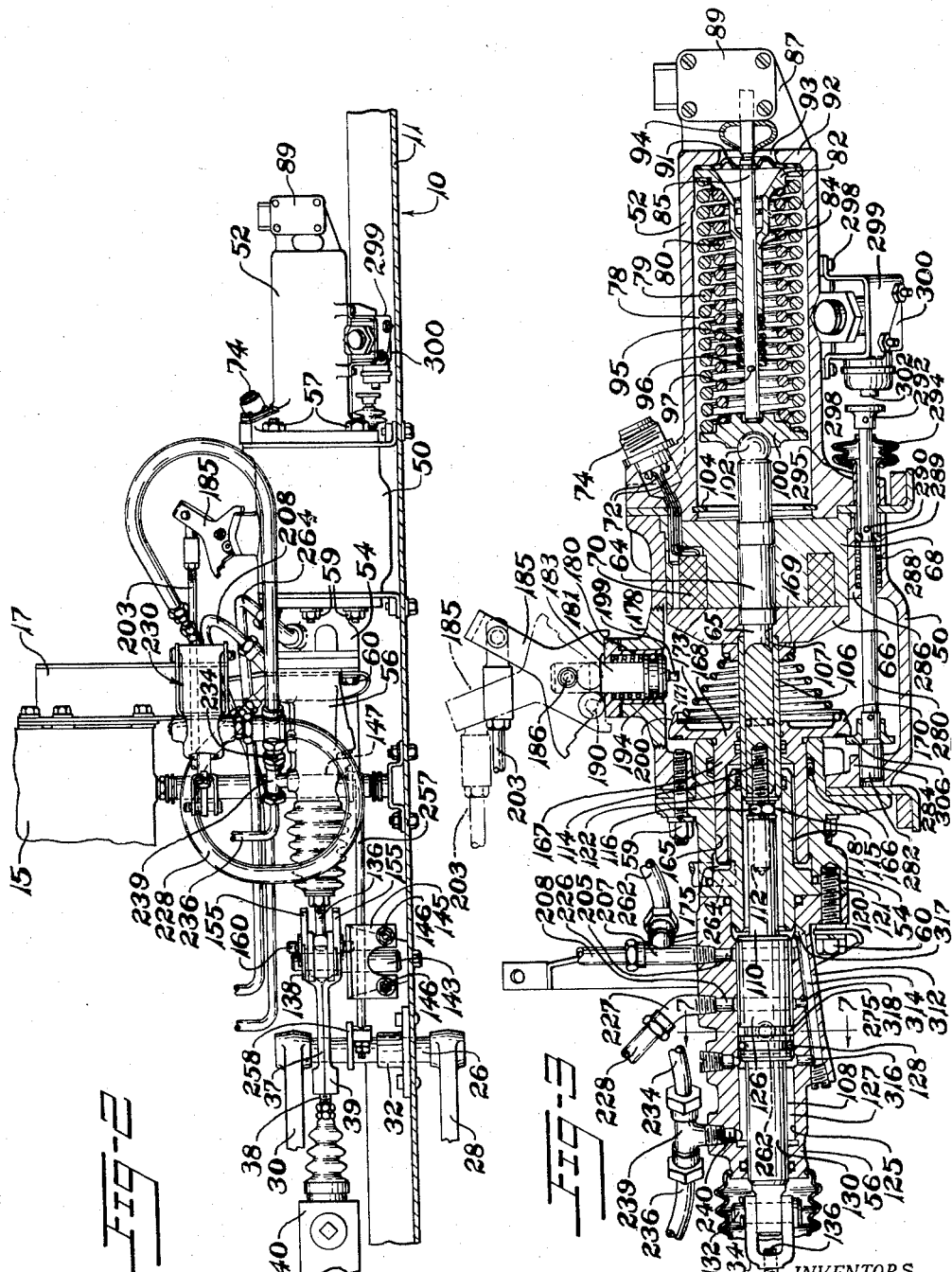

Nov. 18, 1958    R. D. GROVER ET AL    2,860,735
POWER ACTUATED BRAKE OPERATING MECHANISM
Filed May 11, 1954    4 Sheets-Sheet 3
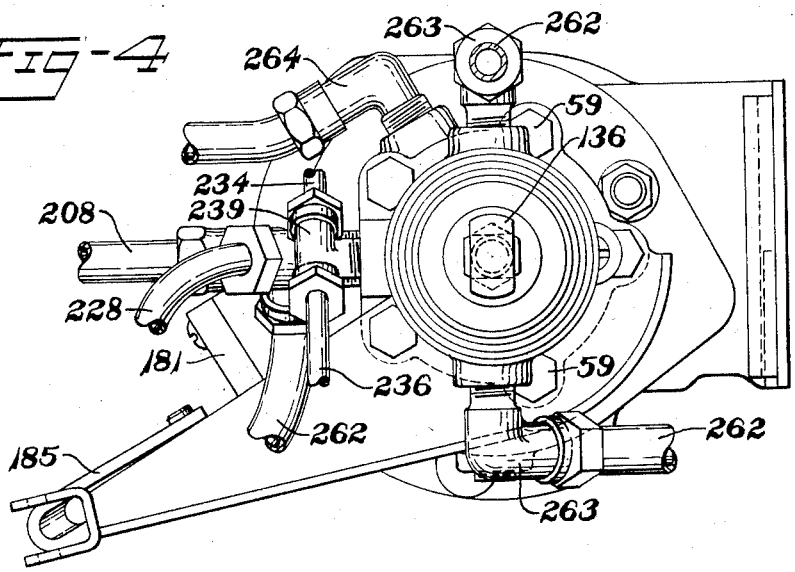
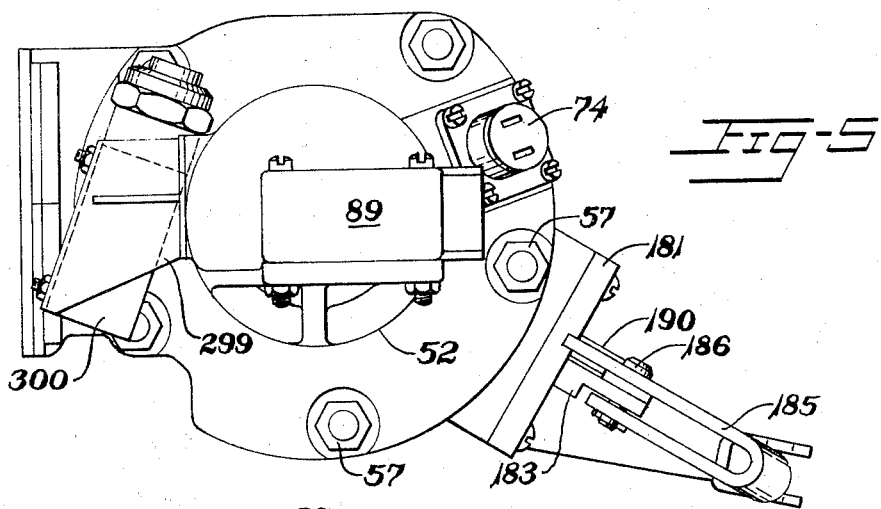
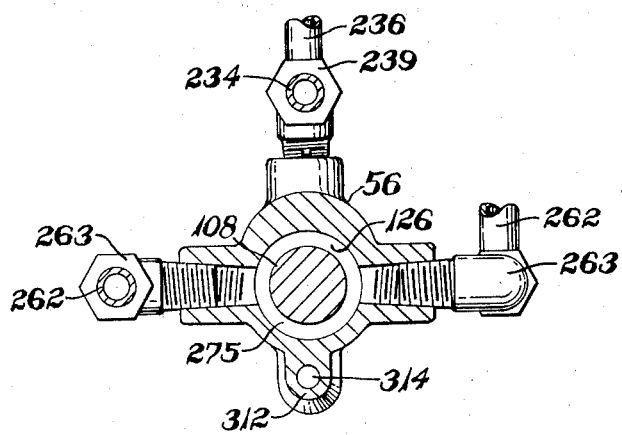
INVENTORS
ROSS D. GROVER
ACHILLES C. SAMPIETRO
BY
Harry O. Ernsberger
ATTY.

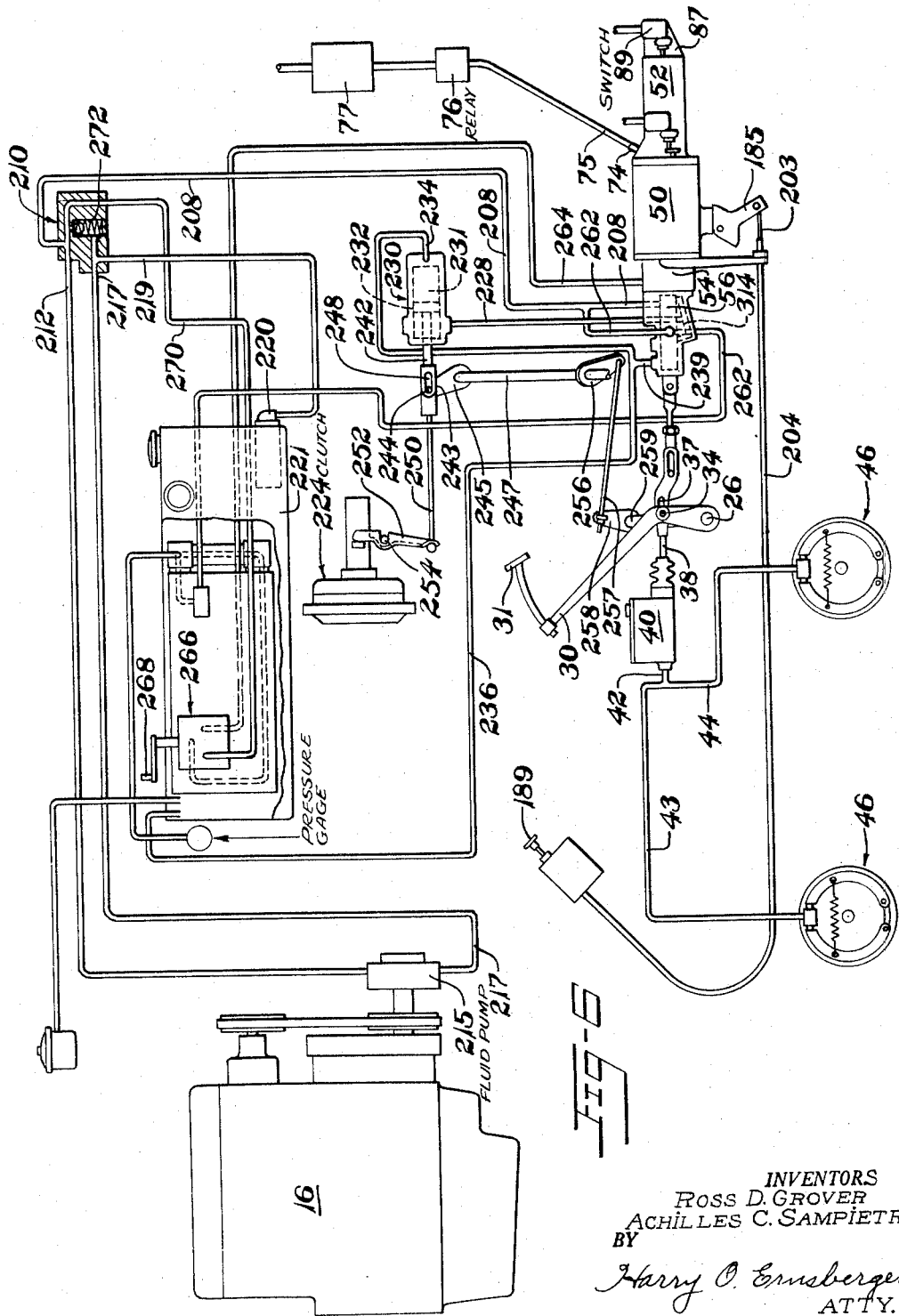

United States Patent Office 2,860,735
Patented Nov. 18, 1958

2,860,735

POWER ACTUATED BRAKE OPERATING MECHANISM

Ross D. Grover, Alma, Mich., and Achilles C. Sampietro, Toledo, Ohio, assignors, by mesne assignments, to Bank of America National Trust and Savings Association, San Francisco, Calif., as agent Application May 11, 1954, Serial No. 429,016

10 Claims. (Cl. 188—106)

This invention relates to mechanism controls such as means for actuating or controlling the brakes of a vehicle, and, more especially, to means responsive to the condition of an electrical circuit for automatically actuating or setting vehicle brakes.

The invention embraces a mechanism for applying vehicle brakes, utilizing potential energy and fluid pressure in a manner to effectively and automatically actuate the brakes of a vehicle.

An object of the invention resides in an arrangement for accumulating and storing potential energy in a member through control of electrically energized means for maintaining the member in a static condition and which is brought into operation by means controlling the operation of the electrical means to effect a release of the member whereby the potential energy stored therein is employed for automatically operating the vehicle brakes.

An object of the invention resides in the provision of spring means adapted to store potential energy and coordinated with fluid pressure means, the arrangement being controlled so that the potential energy of the spring and pressure of the fluid pressure means are utilized concomitantly to effect a setting of the brakes of the vehicle.

Another object of the invention resides in the provision of an automatically operable brake-setting mechanism having means coordinated with the power transmission member of a vehicle wherein automatic operation of the brake-setting means to set the brakes of the vehicle initiates operation of the power-transmitting member for disconnecting the prime mover of the vehicle from the drive wheels to avoid interruption of the operation of the prime mover.

Another object of the invention relates to an automatically operable brake-setting mechanism intercalated with a manually actuated brake-setting mechanism wherein the manual means may be utilized under normal vehicle operation and wherein the automatic brake-setting mechanism may be brought into operation independently of the manual brake-actuating mechanism.

Another object of the invention resides in the provision of automatically controlled, spring and fluid pressure actuated means for effectively setting the brakes of a vehicle independently of the manual mechanism for setting the brakes.

Another object of the invention resides in the provision of an automatically operated means effecting a release of potential energy for actuating the vehicle-braking mechanism in conjunction with manually controlled means for locking out the operation of the automatic means.

A further object of the invention resides in the provision of signal means associated with automatically operable brake-actuating mechanism for visually indicating the condition of the automatic brake-actuating means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a portion of a vehicle chassis showing a form of the brake-actuating means or actuator of the invention incorporated therein;

Figure 2 is a top plan view of the actuator shown in Figure 1;

Figure 3 is a longitudinal sectional view through the actuator;

Figure 4 is a view of the forward end of the actuator construction;

Figure 5 is a rear end view of the actuator construction;

Figure 6 is a semidiagrammatic view illustrating the fluid-pressure lines for operating components of the brake actuator;

Figure 7 is a transverse sectional view taken substantially on the line 7—7 of Figure 3, and Figure 8 is a fragmentary detail view of the lockout means for rendering the automatic actuator ineffective.

The arrangement of the present invention, wherein the automatic brake-setting means is brought into operation by an electric circuit control means, is usable with various types of vehicles and wherever it is desired to employ an automatic means for stopping a vehicle. The embodiment of the invention illustrated in the drawings, wherein the automatic brake-setting mechanism may be advantageously controlled by electronic means, has particular utility when embodied in a vehicle equipped with mine-detecting apparatus for automatically stopping the vehicle when the electronic control means is influenced by the presence of a hidden mine.

Referring initially to Figures 1 and 2 of the drawings a portion of a vehicle with which the brake actuator may be used is illustrated and is inclusive of a frame 10 comprising longitudinally extending side frame members 11 (only one of which is illustrated in Figures 1 and 2) joined together by suitable cross members 14, one of which is shown in Figure 1. As shown in Figure 1, a bell-shaped housing 12, associated with the frame 10, is connected at its forward end with an engine or prime mover 16, shown diagrammatically in Figure 6, and is connected at its rear end with a housing 15 which encloses power transmission gearing or gearset mechanism (not shown) for varying the driving ratio between the engine and the vehicle drive wheels. Secured to the rear of the transmission housing 15 is a transfer case or supplemental housing 17 enclosing supplemental gearing for establishing a drive connection with both the front and rear wheels of the vehicle. A tubular housing 20, enclosing a shaft 22 connected with the steering mechanism of the vehicle (not shown), is equipped with a conventional steering wheel 24.

Extending transversely of the vehicle frame 10 is a shaft 26 which supports a pedal 28 for operating clutch mechanism (not shown) contained within bell-shaped housing 12 for connecting and disconnecting the engine or prime mover from the transmission gearing (not shown) contained in housing 15. This shaft 26 also supports a pedal 30 which is connected with the piston of a master cylinder for exerting fluid pressure to actuate or set the vehicle brakes shown diagrammatically at 46 in Figure 6, by application of foot pressure to the pedal 30. The shaft 26 may be journally supported in a bracket or member 32 carried by a frame member 11 or other suitable portion of the vehicle frame.

The brake pedal 30 is equipped with a pin 34 supporting an abutment or block 35 which is disposed in a slot 36 of a member 37. The member 37 is connected by means of a rod 38 to a piston (not shown) in housing 40 of the master cylinder for actuating fluid-operated brakes of a vehicle. The master cylinder provided by the casing 40 is connected by means of a fitting 42, connected with tubes 43 and 44 (shown in Figure 6), with the brakes 46 at the front and rear wheels of the vehicle. Thus, when the operator desires to "set" the vehicle brakes, he applies foot pressure to the pad 31 of the brake pedal 30, swinging the pedal in a counterclockwise direction as viewed in Figure 1 about the axis of the shaft 26. This movement causes the abutment 35 to move the member 37 in a lefthand direction, as viewed in Figure 1, to move the rod 38 and the piston contained in the master cylinder in housing 40 in a lefthand direction to exert fluid pressure upon fluid contained in the lines 43 and 44 to move the brake mechanism to "set" position. Upon release of pressure on the pedal 30, fluid pressure is relieved in the brake lines 43 and 44 and the brakes are thereby released.

The present invention involves the utilization of automatically operable means for actuating the member 37 and rod 38 to set the vehicle brakes, dependent upon electrically controlled mechanism or other means, so as to effect a stopping of the vehicle by operation of the brake mechanism independently of any action on the part of the vehicle operator. The apparatus for accomplishing this purpose includes a housing construction involving a main, centrally disposed housing 50 supporting rearwardly thereof a second housing or casing 52, an extension or third housing 54 disposed forwardly of the housing 50 and a fourth section or housing 56 secured forwardly of the housing 54. The housing 52 is secured to housing 50 by means of bolts 57, the housing 54 is secured to housing 50 by means of bolts 59 and the housing or casing member 56 is secured to housing 54 by means of bolts 60.

Disposed within the central housing 50 is a longitudinally movable rod, shaft or ram 64 on which is fixedly secured an armature 66, preferably in the form of a soft iron disc so as to be readily magnetized and demagnetized. Mounted within the housing at the rear portion thereof is a core member 68 of the electromagnetic means, preferably formed of soft iron, provided with a recess in which is disposed a coil 70 of current-conducting wire, the leads 72 thereof being joined with a stationary connector or fitting 74 adapted to receive a connector 75 associated with an electrical control circuit including a relay 76 controlled by an electronic device 77 shown diagrammatically in Figure 6 for effecting release of the automatic brake-actuating means.

When current flows through the coil 70, magnetic flux is established in the iron core 68 for holding the armature 66 in engagement with the core as shown in Figure 3. Disposed within a cylindrical chamber 78 formed in the housing 52 is a pair of expansive coil springs designated 79 and 80, respectively. The springs 79 and 80, when compressed, provide potential energy for setting the vehicle brakes. Also disposed in the chamber 78 is a member 82 formed with flanges or ledge portions serving as abutments for the outer ends of the springs 79 and 80. The member 82 is provided with a hollow or sleeve portion 84 forming a guide and support for a pin or rod 85 extending centrally and longitudinally of the chamber 78.

Mounted upon a rearwardly extending portion 87 of the housing 52 is a switch casing 89 enclosing a switch (not shown) in circuit with a red pilot or signal lamp (not shown) on the instrument panel of the vehicle. One end portion of the rod 85 extends exteriorly of the housing 52, projects into the switch casing 89 and is adapted to close the contacts to energize the circuit of the red pilot light when the springs 79 and 80 are in compressed position as shown in Figure 3. A flexible diaphragm 91, formed of synthetic rubber or the like, has a peripheral portion disposed between the end of the fitting or member 82 and an inwardly extending flange 92 formed on the housing 52, the diaphragm engaging and surrounding the rod 85 to effect a seal for the opening 93 in the end of the housing 52. A flexible member 94 encloses the rod 85 at its entrance into the switch housing 89 to exclude dust and moisture. An expansive coil spring 95 engages a disk 96 which is held in place on the rod 85 by means of a pin 97, the spring engaging the fitting or member 82 to urge or bias the rod 85 in a lefthand direction as viewed in Figure 3.

Reciprocably mounted within the chamber 78 is a movable member or abutment 100 which is engaged by the opposite extremities of the coil springs 79 and 80, the member 100 having a spherically shaped recess engaging a ball-shaped element 102 carried by one end of the shaft or ram 64. The recess-and-ball arrangement provides an articulate connection for member 100 to compensate for any irregularities in the seating of the springs 79 and 80 upon the member 100. A snap ring 104 is engaged in a circumferential recess formed in the wall of chamber 78 in order to limit movement of the member 100 and springs 79 and 80 in a left hand direction as viewed in Figure 3. The potential energy accumulated or stored in the springs 79 and 80 when they are in compressed condition as illustrated in Figure 3 provides one of the forces for automatically effecting a setting of the brake mechanism.

The ram or shaft 64 is provided or formed with a tenon portion 65 which is received in a sleeve 106. The sleeve bears against a ledge or flange 107 formed on the armature so that the armature is movable with the shaft 64. Axially aligned with the shaft 64 is a reciprocable member 108 contained within the casing members or housings 54 and 56. The member 108 is provided with a tenon portion 110. The adjacent extremities of tenon portion 65 of shaft 64 and tenon portion 110 of member 108 are bored and threaded to receive threaded portions 112 and 114 formed on member 115 which has a polygonally shaped portion 116 for rotating member 115 to thread the portions 112 and 114 into the respective bores in tenons 65 and 110 to connect the tenons together.

The casing or housing 54 is adapted to receive and support a sleeve-like member 118 having a flange portion 120 for securing the member 118 to the casing 54 by means of bolts 121. The hollow interior of the sleeve 118 is adapted to slidably accommodate the exterior surface of sleeve 106, a fluid-tight seal 122 being carried in an annular recess formed in the sleeve 118 and engageable with the exterior cylindrical surface of sleeve 106.

The housing 56 is formed with a cylindrical bore 125 within which is disposed a piston or piston portion 126 formed on member 108, a fluid-tight seal 128 being disposed in an annular recess in the piston 126 and forming a fluid seal with the wall of the bore 125. The member 108 is formed with a forwardly disposed tenon or rod portion 130 extending through the front wall of housing 56, the portion extending exteriorly of the housing being formed with an eye arranged to accommodate a pin 132 which projects through the eye and aligned openings in the furcations of a clevis member 134. The clevis member 134 is connected by member 136 with the lower extremities of a bifurcated arm or lever 138 by means of a pin 139 passing through aligned openings in the furcations 140 of the arm 138, the arm 138 being pivotally supported upon a stub shaft 143 secured to a bracket 145 mounted upon the side frame member of the vehicle and held in place by bolts 146. Disposed adjacent the arm 138 is member 37 formed of two thick sheet metal components welded together throughout a portion of their length, the components of member 37 being spread apart adjacent the arm 138 to form furcations 155 which straddle the arm 138. The furcations 155 are provided with transversely aligned slots 158 to accommodate a pin 160 which extends through the slots 158 and through the aligned openings in the furcations 140 of the arm 138. From an examination of Figure 1, it will be noted that the forward extremities of the components of member 37 are configurated to form a hollow boss portion 39 in which member 38 is welded to establish an operative connection between the member 37 and the piston (not shown) contained in the master cylinder formed in the housing 40 of the brake-actuating means. From examination of Figures 1 and 3, it will be apparent that operation of the conventional, fluid-operated braking mechanism of the vehicle may be initiated by applying pressure upon the pedal 30 without affecting the automatic brake mechanism. For example, by exerting foot pressure against the pad 31 of pedal 30, the latter is swung in a counterclockwise direction, as viewed in Figure 1, around the axis of shaft 26 which causes engagement of the abutment 35 with the lefthand end of slot 36 in member 37 to move member 37 and rod 38 in a lefthand direction to exert pressure on the piston in the master cylinder 40 to establish fluid pressure in the brake lines and thus effect a setting of the brakes in the conventional manner. During this operation of setting the brake mechanism by pedal actuation, the pin 160 freely moves in or traverses the slots 158 in the furcations of member 37 without any effect upon the automatic brake-actuating means.

The housing or casing 54 is formed with a cylindrical interior surface 165 into which projects a sleeve or piston portion 167 of a member 168. The inner diameter of the sleeve portion 167 is of a size to slidably accommodate the sleeve portion 118. A sealing ring 166 forms a fluid seal between the sleeve portion 167 and the housing wall. Member 168 is integrally formed with a disklike portion 170 forming a seat for the large-diameter end of a cone-shaped expansive coil spring 173, the end of smallest diameter engaging a washer 169 adjacent the face portion of the armature 66. The portion 170 of member 168 is formed with a peripheral flange 171 to properly center the spring 173. By introducing fluid under pressure into the chamber 175 which normally receives the sleeve portion 167, the member 168 is moved in a righthand direction as viewed in Figure 3. This movement compresses spring 173, moving the armature 66 into engagement with the core 68 of the electromagnetic means; and when the coil 70 is energized, the automatic brake-actuating means is in a cocked position for setting the brakes.

The arrangement includes safety means controlled by the vehicle operator for prevenitng release of the armature 66 and the means connecting the armature with the vehicle brake mechanism to avoid transmission of potential energy or force stored in the springs 79 and 80 to actuate the brake mechanism. As shown in Figures 3 and 8, the wall of housing 50 is formed with a comparatively large diameter, threaded aperture which receives a fitting 178 having a hub portion bored to receive a sleeve-like member 180 provided at its upper end with a flange 181 which seats against a portion of fitting 178. Disposed within the sleeve portion of member 180 is a member or plunger 183 connected to a control arm or lever 185 through the medium of a pivot pin 186. The arm or lever 185 is provided with a pin 188 on which are journaled rollers 190 adapted for engagement with the upper planar surface 191 of member 180 as shown in Figures 3 and 8.

The plunger 183 is integrally formed with disk-like portions 192 and 193 bounding a recess in which is disposed a sealing ring 194 which engages the inner wall of the sleeve 180. A spring 197 is disposed between an end wall of member 180 and the disk 192 and serves to continuously bias the plunger 183 toward its lowermost position. The plunger 183 is provided with a projection 199 which provides an abutment for preventing operation of the automatic brake-setting mechanism. When the member 168 is moved in a righthand direction as viewed in Figure 3, under the influence of fluid under pressure introduced into the chamber 175, the frustoconical or tapered portion 200 of the portion 170 engages the projection 199. Due to the angularity of the surface 200, movement of member 168 in a righthand direction, as viewed in Figure 3, compresses the spring 197, moving the plunger 183 outwardly to the extent that the projection 199 clears the exterior periphery of the flange 179. The plunger 183 and projection 199 are moved downwardly under the influence of the spring 197 whereby the projection 199 engages the side wall of flange 170.

The wall of flange 170 is formed with an angularly arranged (Figure 8), annular surface 202, and the side wall of projection 199 is of substantially the same angularity as surface 202 so that when the projection 199 engages the surface 202, the angular surfaces tend to prevent disengagement of the projection 199 from the surface 202. Therefore, with the abutment 199 engaged with the surface 202, the springs 79 and 80 are held in compressed or energy-storing position and cannot be released until the manually operated lever 185 is swung to a position to withdraw projection 199 from engagement with surface 202. This arrangement provides a safety device to prevent automatic operation of the brake-setting means. The lever 185 is actuated by a cable 203 contained within a sheath 204 and is provided with a control handle 189 mounted on the column 20 of the steering means.

Fluid pressure means is provided, supplementing the force of springs 79 and 80, for automatic operation of the brake-setting mechanism. The wall of member 56 is formed with a port 205 in communication with the chamber occupied by piston or plunger 126 and, upon movement of piston 126 in a lefthand direction as viewed in Figure 3, is opened to receive fluid under pressure at the righthand end of the piston. The port 205 is in communication with a fitting 207 and a fluid line or pipe 208 connected with a junction block or fitting 210 and, through the junction block, is in communication with a fluid pressure line or pipe 212 connected with the pressure or outlet side of a fluid pump 215 driven by the vehicle engine 16. The inlet side or suction side of the fluid pump 215 is in communication with the junction block 210 by means of a pipe 217 and is connected to the fluid or oil reservoir or receptacle 221 through fluid line or pipe 219 and a filter 220. The receptacle 221 is adapted to contain a supply of fluid, such as oil, for operating various mechanisms hereinafter described.

When the piston 126 is in the position shown in Figure 3, the port or duct 205 is closed by the piston. However, as soon as the piston 126 moves toward brake-setting position by release of the precompressed springs 79 and 80, the port 205 is then placed in communication with the chamber 127 occupied by piston 126 permitting fluid under pressure to flow into the chamber, exerting pressure upon the righthand end of the piston and, in this manner, augmenting the effective force of the springs 79 and 80 acting upon and urging the piston 126 toward brake-setting position.

Means are provided for actuating the clutch 224 for disconnecting the transmission of power from the vehicle engine 16 to the vehicle drive wheels (not shown) when the automatic brake-setting mechanism is released. The member 56 is formed with a port 226 which is connected by means of fitting 227 and fluid line or pipe 228 with a clutch actuator 230 (Figure 6) which includes a cylinder 231 in which a piston 232 is reciprocably mounted. The opposite end of cylinder 231 is connected by means of a pipe 234 with a fluid-return line or pipe 236 which is in communication with the fluid reservoir 221. The fluid-return lines 234 and 236 are in communication with a fitting 239 which, in turn, is in communication with a port 240 formed in the lefthand end of member 56 as shown in Figure 3 and in communication with the piston chamber 127.

The piston 232 in the cylinder 231 is carried by a rod 242 equipped with a clevis portion 243 connected by means of a pin 244 with an arm 245 mounted upon a shaft 247 which extends transversely of the vehicle and is mounted for rotation in suitable bearings (not shown). The pin 244 extends into slots 248 formed in clevis 243 in order to facilitate manual operation of the clutch 224 independently of the fluid actuator 230. The arm 245 is connected by means of rod 250 with a clutch-releasing lever 252 fulcrumed, as at 254, upon a clutch housing (not shown). The shaft 247 is provided with a second arm 256 connected by means of a rod 257 with an arm 258 which is carried upon a rock shaft 26 provided with a clutch-operating pedal 28, shown in Figure 2, for operating the clutch independently of the actuator 230.

Formed in a boss portion 312 forming a part of housing 56 is a longitudinally extending duct or channel 314 as shown in Figure 3. The lefthand end of duct 314 is in communication by means of a passage 316 with the chamber occupied by piston 126. The other end of duct 314 is in communication by means of a passage 317 with the lefthand zone of the chamber occupied by piston 126. Formed circumferentially of piston 126 in the wall of the chamber 127 is an annular groove 318 which establishes communication between tube 228 and longitudinally extending duct 314. The duct 314 provides means for establishing flow of fluid under pressure to the clutch actuator 230 and a fluid return connection to the reservoir from the chamber 127 occupied by the piston and is subjected to fluid pressure when piston 126 is moved to brake-setting position under the initial influence of the release of the compression pressure of springs 79 and 80.

When the automatic brake-setting mechanism is released, the piston 126 is moved in a lefthand direction, as viewed in Figure 3. Fluid under pressure from line 208 flows into chamber 127 at the righthand end thereof, through passage 317, duct 314 and annular groove 318 through the line 228 into the lefthand end of cylinder 231 of the clutch actuator 230 to exert pressure upon the piston 232 in a righthand direction as viewed in Figure 6. This movement of piston 232 moves the clevis 243 in a like direction and, through the medium of pin 244, moves the rod 250 and lever 252 to disconnect the clutch from the vehicle engine and interrupt the transmission of power to the vehicle wheels. Thus, when the automatic brake-setting mechanism is released to brake-setting position, fluid under pressure actuates the piston 232 to disconnect clutch 224 and prevent stalling of the vehicle engine. During righthand movement of piston 232 in cylinder 231, the fluid contained in the righthand end of the cylinder flows through the return pipes 234 and 236 into reservoir 221.

When piston 126 is moved in a righthand direction as viewed in Figure 3 by introduction of fluid into annular chamber 175, the fluid in the righthand end of the chamber 127 occupied by piston 126 is returned to the reservoir 221 in a manner hereinafter explained. Fluid under pressure is introduced into annular chamber 175 by fluid pressure line or pipe 264 which is connected with a brake actuator control valve (not shown) contained in valve casing or housing 266. The valve mechanism within the housing 266 is controlled by means of a member or arm 268 connected to the valve mechanism. The control valve in casing 266 is in communication with the fluid-line junction block 210 by means of a line or pipe 270. Manual movement of member 268 actuates the valve means to direct fluid under pressure from line 270 into the line 264 thereby conveying fluid under pressure into the annular chamber 175. The junction block 210 embodies a relief valve means 272 to prevent excessive pressure being built up in the hydraulic circuit.

It has been found that when the automatic brake-setting mechanism is brought into operation by interrupting the circuit through the coil 70 which retains the brake mechanism in operative position, springs 79 and 80, upon release from their compressed condition, exert a substantial impact upon the fluid in master cylinder in the housing 40. This impact is communicated through the brake fluid lines to the brakes on the vehicle wheels and effects an instantaneous braking action upon the wheels. However, springs 79 and 80 tend to rebound after their initial impact to brake-setting position. Hence, the brake-setting action slackens off after the initial impact by reason of the rebound action of the springs, effecting a partial release of pressure on the piston in the master cylinder.

In addition to the brake-setting force exerted by the springs 79 and 80, the present arrangement provides fluid pressure actuated means to augment the brake-setting force of the springs to compensate for the tendency of the springs to rebound and to exert a constant pressure upon the piston in the master cylinder, providing a substantially constant braking force on the vehicle wheels. When the automatic brake-setting mechanism is in cocked position, fluid circulates continuously through the line 208 and the line 262. The fluid line 262 includes passages through the housing 56 as shown in Figure 7. Fittings 263 in the line 262 at opposite sides of the housing 56 are in communication with an annular groove 275 formed in the peripheral zone of piston 126. When piston 126 is in the position shown in Figure 3, a through channel for the circulation of fluid through line 262 is provided through fittings 263 and groove 275 as shown in Figure 7. Upon release of the automatic brake mechanism, the piston 126 is moved in a lefthand direction, as viewed in Figure 3, and flow of fluid through line 262 is blocked by reason of annular channel 275 being moved out of registration with the ports in the wall of housing 56 associated with the fittings 263. During movement of piston 126 in a lefthand direction, the port 205 in communication with fluid pressure line 208 is uncovered, and fluid under pressure flows through line 208 and port 205 into the righthand end of the chamber occupied by piston 126. This fluid under pressure exerts hydraulic force against the righthand end of piston 126 as viewed in Figure 3, thereby supplementing the pressures of springs 79 and 80 with fluid pressure acting against piston 126. The fluid pressure prevents or minimizes the effect of any rebound action of the springs 79 and 80 on the brake mechanism.

Means are provided for indicating the status or condition of the automatic brake-setting mechanism. As particularly shown in Figure 3, there is provided a rod or shaft 280 which is slidably supported in suitable openings formed in boss portions extending inwardly from the wall portions of housing 50. One end of the shaft 280 is formed with an enlarged tenon 282, slidably mounted in a bore in the boss 284. The intermediate zone of shaft 280 is supported in a bearing formed in a boss 286. Shaft 280 is normally biased toward a righthand position as viewed in Figure 3 under the influence of an expansive coil spring 288 abutting a disk 289 which, in turn, engages pin 290 extending transversely through an opening in the shaft. An end of shaft 280 extends exteriorly of the housing portion 50 and is provided with knob or button 292. A sealing member 294 of flexible material surrounds shaft 280 and is secured to metal sleeve 295 which is fitted snugly in a bore in flange portion of housing 52.

Secured to an exterior wall of housing portion 52 by means of screws 298 is a bracket member 299 supporting a housing 300 containing pilot lamp circuit control or switch mechanisms (not shown). A plunger 302 extends exteriorly of housing 300, and slidable movement of plunger 302 actuates the switch mechanism contained in housing 300. The button 292 on the end of shaft 280 is biased under the influence of spring 288 into engagement with plunger 302 when fluid pressure is introduced into chamber 175 to move members 168 and 66 in a righthand direction to effect a cocking of the automatic brake-actuating mechanism in a potentially operative position. A switch means in the housing 300 is in circuit with a pilot lamp, preferably green in color. The other switch in housing 300 is intercalated in a circuit with a switch contained in housing 89 for controlling the energization of a second pilot lamp, preferably red in color. The pilot lamps (not shown) are mounted on the instrument panel of the vehicle.

When the shaft 280 is in the position shown in Figure 3 and member 168 is in its fully retracted position, the button 292 is out of contact with plunger 302 and the green pilot lamp is energized to indicate that the automatic mechanism for actuating the vehicle brakes is in readiness to operate the brake mechanism. When the automatic braking mechanism has been released to "set" the brakes of the vehicle, the shaft 85 contained in housing 52 is moved in a lefthand direction as viewed in Figure 3 under the influence of expansive spring 95, closing the switch contained in housing 89 to energize the red pilot lamp, indicating that the automatic brake-setting mechanism is in brake-setting position.

The red pilot lamp is also energized under the following conditions. Shaft 280 is provided with flange member 306 secured thereon which is in the path of movement of portion 170 of member 168. When the member 168 is moved to its retracted position under the influence of spring 173, the flange member 306 is engaged by portion 170 of member 168 to move shaft 280 in a lefthand direction, as viewed in Figure 3, to retract button 292 from engagement with plunger 302. If, for any reason, the member 168 does not move to its fully retracted position, as for example, if fluid flow out of chamber 125 is interrupted or blocked for any reason, the portion 170 does not engage flange 306 and hence shaft 280 is not moved in a lefthand direction. Under these conditions, the pressure of spring 288 holds button 292 in contact with plunger 302 so that the switch mechanism in housing 300 is in a position energizing the red pilot lamp to indicate an improper condition in the system which may prevent the effective setting of the brake mechanism. Thus the red pilot lamp must be de-energized by disengagement of button 292 from plunger 302, at which time a switch means in housing 300 completes the circuit through the green pilot lamp to indicate proper cocking or potentially operative position of the automatic brake-operating mechanism.

The electromagnetic means provided by the core 68 and coil 70 when energized is utilized to hold the automatic brake-setting mechanism in cocked position, and an interruption of current flow through the circuit of the coil 70 effects an operative movement of the mechanism to set the brakes. The disclosed arrangement is especially adaptable for installation in a vehicle equipped with mine-detecting apparatus wherein the presence of a mine in the zone of the detecting apparatus affects a circuit of an electronic means (not shown), causing the circuit through coil 70 of the electromagnet to release the armature 66 and effect a setting of the brakes of the vehicle. When employed for mine-detecting purposes, the operation of the mechanism is as follows. With the vehicle engine in operation, pump 215, driven by the engine, establishes fluid circulation in certain of the fluid circuits. With the valve-controlling member 268 in a neutral position, free-flow circulation of fluid by pump 215 is established through pipes or lines 212, 270, 208 and 262, the pipes or lines 270 and 262 returning the oil or other fluid to reservoir 221. With current flow established in the circuits of the switches, contained in housings 89 and 300, controlling the red pilot lamp, said lamp is energized, indicating that the automatic brake-setting mechanism is in brake-setting position. The energization of the red pilot lamp takes place by reason of rod 85 being moved to its extreme lefthand position, as viewed in Figure 3, under the influence of expansive spring 95.

To place the automatic brake-operating mechanism in a cocked or potentially operative position, viz., in a position to be released automatically to set the brakes, the vehicle operator moves the valve control member or lever 268 to an operative position wherein the valve in the casing 266 establishes flow or fluid under pressure to chamber 175 through duct or tube 264. The fluid under pressure in line 264 flows into chamber 175 in housing 54 and causes longitudinal movement of member 168 in a righthand direction as viewed in Figure 3. This movement of member 168 compresses the cone-shaped, helical spring 173, moving the armature 66 into the position shown in Figure 3 in engagement with core 68 of the electromagnet. Electric current flow is established through coil 70 by suitable circuit (not shown) setting up sufficient magnetic flux to hold armature 66 and associated mechanism in cocked position as shown in Figure 3. As armature 66 is fixedly secured on ram or rod 64, the rod 64 is moved in a righthand direction to the position shown in Figure 3, compressing the springs 79 and 80. The safety lock for the brake mechanism is provided by plunger 183, lever 185 and projection 199 when in the position indicated in full lines in Figure 3. In this position, the projection 199 extends into the path of member 168, being urged to that position under the influence of expansive coil spring 197, and the safety lock is in an "on" position. As member 168 moves past projection 199, the cone-shaped surface 200 of member 168 causes movement of projection 199 outwardly, compressing spring 197, the disk-like portion 170 of member 168 moving to the opposite side of projection 199. When the disk-like portion 170 has cleared the projection, the latter is immediately moved inwardly by the compressive pressure of spring 197 and prevents retractive movement of member 168. With the safety lock in "on" position, the automatic brake-setting mechanism may be released but cannot move to brake-setting position because of the projection or locking member 199 engaging the disk portion 170 of member 168. To move the safety lock mechanism to "off" position, cable 203, connected with lever 185, is actuated by manipulating knob 189, mounted upon the instrument panel of the vehicle, to swing lever 185 into the broken-line position shown in Figure 3 (see Figure 8). This action moves the roller 190 across surface 191, moving lever 185 upwardly, withdrawing plunger 183 outwardly and moving projection 199 to a position out of the path of member 168.

The pressure of fluid in chamber 175 has moved armature 66 to the position shown in Figure 3, thereby cocking the automatic brake mechanism. The operator moves valve control member 268 to a neutral position. This action moves the valve contained within housing 266 to a position relieving fluid pressure in line 264 whereby the oil or fluid in chamber 175 may be returned to reservoir 221 through line 264. When fluid pressure is thus relieved in chamber 175, the expansive pressure of spring 173 in compressed position moves member 168 in a lefthand direction, as viewed in Figure 3, causing the oil or fluid in chamber 175 to be returned to the reservoir through tube or duct 264.

As member 168 approaches the position shown in Figure 3, disk-like portion 170 engages flanged member 306 on shaft 280, moving the shaft longitudinally in a lefthand direction, as viewed in Figure 3, to disengage button 292 from switch plunger 302. This action causes the switch mechanism in housing 300 to complete a circuit through the green pilot lamp which indicates to the operator that the automatic brake-setting mechanism is in cocked position and that other elements are in their proper relation to permit automatic release and operation of the brake-setting mechanism.

When the valve control member 268 is in neutral position, free flow of fluid or oil is established through ducts 208 and 262 into the reservoir 221.

Assuming that the mechanism is used with a mine-detecting apparatus carried by the vehicle and that the detector is influenced by the presence of a mine, the control means 77 for the electromagnet circuit (forming no part of the present invention) is rendered effective to interrupt current flow through coil 70 of the electromagnetic armature-retaining means. Interruption of current flow through coil 70 reduces the magnetic flux, and armature 66 is instantly released. The potential energy or force stored in the compressed springs 79 and 80 moves ram or rod 64, piston 126, clevis 134 and rod 136 in a lefthand direction, as viewed in Figure 3, to move the piston in the master cylinder 40, establishing fluid pressure in brake lines 43 and 44 to set the vehicle brakes. Upon movement of piston 126 toward brake-setting position, port 205 is uncovered by the piston and port 316 is blocked thereby, thereafter preventing fluid from returning to the reservoir through duct or tube 262. Blocking port 316 causes an increase in fluid pressure in tube or duct 208 so that fluid under pressure is then directed through fitting 207 and port 205 into the piston chamber at the righthand end of the piston. Introduction of fluid under pressure into the chamber at the righthand end of piston 126 supplements or augments the pressure of springs 79 and 80 in establishing additional brake-setting force operable upon the piston of master cylinder 40. Introduction of fluid pressure into the piston chamber minimizes the effect of the tendency of springs 79 and 80 to rebound after the initial brake-setting impact of the springs. Hence, with this arrangement, both spring pressure and fluid pressure are employed as brake-setting forces, acting in the above-described manner.

The mechanism is arranged so that concomitantly with the release of the automatic brake-setting mechanism to brake-setting position, the clutch mechanism for establishing power from the vehicle to the drive wheels of the vehicle is automatically released or disconnected from the engine. Immediately upon blocking of port 316 by piston 126, the fluid pressure built up in duct 314 through the transmission of fluid under pressure in the piston chamber through port 317 is communicated to the clutch-operating means 230 through the annular passage 318, port 226 and tube 228. Flow of fluid under pressure through duct 228 is effective on the lefthand side of piston 232 in the clutch actuator housing 231, moving piston 232 in a righthand direction, causing concurrent movement of rod 250 to swing the clutch (224) control lever 252 about its fulcrum to release the clutch in the bell-shaped housing 12 and disconnect transmission of power from the engine to the drive wheels of the vehicle. This action prevents stalling of the vehicle engine.

When ram or rod 64 is moved to brake-setting position, rod 85 in housing 52 is moved in a lefthand direction under the influence of spring 95 which causes the switch contained in housing 89 to be closed, energizing the red pilot lamp to indicate that the brakes are in set position. The circuits of the switches contained in housings 89 and 300 are interlocked so that when the switch in housing 89 closes the circuit to energize the red pilot lamp, the circuit to the green pilot lamp is interrupted, de-energizing the same.

The following actions take place when the brake-setting mechanism is again moved to cocked position. To accomplish this result, the operator moves valve control member or lever 268 away from neutral position to move the fluid control valve to a position providing free venting of tube 262 into the reservoir 221, thus relieving fluid pressure in tubes 262 and 208 to re-establish free flow or circulation of oil or fluid in these lines. The control valve also connects tube 264 with tube 270 whereby fluid under pressure is conveyed into chamber 175 to cause movement of member 168 in a righthand direction as viewed in Figure 3. This movement of member 168 again compresses spring 173 and moves armature 66 to the position shown in Figure 3. As the armature is moved in a righthand direction it carries with it piston 126. This movement of piston 126 in a righthand direction forces the oil or fluid in the righthand end of the chamber occupied by the piston to be returned to the reservoir through tubes 208 and 262. Flow of fluid into the piston chamber 127 is had through lines 239 and 234 from tank-return line or tube 236 as there is no pressure in these lines or tubes. When piston 126 is moved in a lefthand direction to brake-set position, the fluid or oil in the lefthand zone of the piston chamber is forced through port 240 and return line 236 into reservoir 221.

After armature 66 is moved to cocked position and current in the coil 70 holds the mechanism in such position, the operator again moves valve-actuating lever or member 268 to neutral position, member 168 is returned in a lefthand direction under the influence of spring 173 and the mechanism is again in position for initiating a brake-setting cycle.

It is apparent that, within the scope of the invention, modifications and different arrangements may be made other than is herein disclosed, and the present disclosure is illustrative merely, the invention comprehending all variations thereof.

We claim:

1. Apparatus of the character disclosed in combination with hydraulically actuated brake mechanism of a vehicle, a source of fluid under pressure, an automatic brake-setting unit including a housing, a ram in the housing, spring means engageable with the ram, control means for directing fluid pressure against the ram to compress the spring means, armature means carried by said ram, electrically controlled magnet means engageable with said armature means for retaining said ram in spring-compressing position and for releasing the ram, said spring means in ram-released position exerting a force to set the brake mechanism, and means operable upon release of the ram to brake-setting position for directing fluid under pressure against the ram in a direction to augment the brake-setting force of the spring means.

2. Apparatus of the character disclosed in combination with operator-controlled hydraulically actuated brake mechanism of a vehicle, a source of fluid under pressure, an automatic brake-setting mechanism including a ram, spring means engageable with the ram, control means for directing fluid pressure against the ram to compress the spring means, electromagnetic means for retaining said ram in spring-compressing position, electrical relay means for de-energizing the electromagnetic means to release the ram for movement to brake-setting position under the influence of the spring means, and means operable upon release of the ram to brake-setting position for directing fluid under pressure against the ram in a direction to supplement the effective brake-setting force of the spring means.

3. Apparatus of the character disclosed in combination with hydraulically actuated brake mechanism of a vehicle including a master cylinder and piston for transmitting braking pressure to the vehicle wheels, a member adapted to move the piston, spring means for actuating the member, a pump for developing fluid pressure, an element associated with the member actuated by fluid under pressure from the pump for compressing the spring means, electrically energized means for holding the spring means in compressed condition, and relay means for automatically de-energizing the electrically energized means to release the compressed spring means and actuate the brakes of the vehicle through pressure of the spring means acting on said member.

4. Apparatus of the character disclosed in combination with hydraulically actuated brake mechanism of a vehicle including a master cylinder and piston for transmitting braking pressure to the vehicle wheels, a ram adapted to move the piston, spring means for actuating the ram, a pump for developing fluid pressure, an element associated with the ram, means for moving the element for compressing the spring means, electrically energized means for holding the spring means in compressed condition, circuit-controlling means for de-energizing the electrically energized means to release the compressed spring means and actuate the brakes of the vehicle through pressure of the spring means acting on said member, and means operable concomitantly with release of the compressed spring means for establishing flow of fluid under pressure against said ram for augmenting the brake-setting force of the spring means.

5. Apparatus of the character disclosed in combination with hydraulically actuated brake mechanism of a vehicle including a master cylinder and piston for transmitting braking pressure to the vehicle wheels, a ram adapted to move the piston, spring means for actuating the ram toward brake-setting position, a pump for developing fluid pressure, a member associated with the ram actuated by fluid under pressure from the pump for compressing the spring means, electrically energized means for holding the spring means in compressed condition, circuit-controlling relay means for de-energizing the electrically energized means to release the compressed spring means and actuate the brakes of the vehicle through pressure of the spring means acting on said ram, and means operable concomitantly with release of the compressed springs for establishing fluid pressure against said ram in a direction augmenting the force of the spring means by fluid pressure.

6. In combination, means for automatically effecting a setting of brakes of a vehicle including an enclosure, a reciprocably mounted ram in the enclosure, spring means in the enclosure, an electrically energizable magnetic means in the enclosure, an armature on the ram, means to move the ram in a direction to compress the spring means, circuit-establishing means including a relay for energizing the magnetic means to retain the ram in spring-compressing position, said spring means being arranged to move the ram to brake-setting position upon de-energization of the magnetic means, a source of fluid under pressure, and means rendered effective upon movement of the ram toward brake-setting position for directing fluid under pressure against the ram for augmenting the brake-setting pressure of the spring means.

7. In combination, means for automatically effecting a setting of brakes of a vehicle including an enclosure, a reciprocably mounted ram in the enclosure, spring means in the enclosure, an electrically energizable magnetic means in the enclosure, an abutment on the ram, a member in said enclosure engageable with the abutment to move the ram in a direction to compress the spring means, circuit-establishing means including a relay for energizing the magnetic means to retain the ram in spring-compressing position, said spring means being arranged to move the ram to brake-setting position upon de-energization of the magnetic means, a source of fluid under pressure, and means rendered effective upon movement of the ram toward brake-setting position for directing fluid under pressure against the ram for augmenting the brake-setting pressure of the spring means.

8. In combination, means for automatically effecting a setting of brakes of a vehicle including an enclosure, a reciprocably mounted ram in the enclosure, spring means in the enclosure, an electrically energizable magnetic means in the enclosure, an abutment on the ram, a member in said enclosure engageable with the abutment to move the ram in a direction to compress the spring means, circuit-establishing means including a relay for energizing the magnetic means to retain the ram in spring-compressing position, said spring means being arranged to move the ram to brake-setting position upon de-energization of the magnetic means through operation of said relay, a source of fluid under pressure, means rendered effective upon movement of the ram toward brake-setting position for directing fluid under pressure against the ram for augmenting the brake-setting pressure of the spring means, and manually controlled locking means for preventing movement of the ram and spring means toward brake-setting position upon de-energization of the magnetic means.

9. A system for automatically applying brakes of an automotive vehicle including a source of fluid under pressure and a relatively movable brake-setting member, a brake-setting spring, a fluid pressure operated piston connected with said member, electromagnetic means for holding said spring in compressed condition, operator-controlled means for directing fluid pressure against the piston to move the member to compress said spring, relay means for de-energizing the electromagnetic means to release the member whereby the spring exerts a force against the member to set the vehicle brakes, the movement of the member to brake-setting position establishing flow of fluid from the pressure source against the member whereby the pressure of the fluid supplements the brake-setting force of the spring.

10. A system of automatically applying brakes of an automotive vehicle including a source of fluid under pressure and a relatively movable brake-setting ram, a brake-setting spring, operator controlled means for directing fluid under pressure against the ram to compress the brake-setting spring, electromagnetic means for holding said brake-setting spring in compressed condition, relay means connected with the electromagnetic means for releasing the ram whereby the spring effects movement of the ram to set the vehicle brakes, a fluid port associated with the ram, the movement of the ram to brake-setting position opening said port to establish flow of fluid from the pressure source against the ram whereby the pressure of the fluid augments the brake-setting force of the spring.

References Cited in the file of this patent

UNITED STATES PATENTS

| | | |
|---|---|---|
| 1,319,008 | King | Oct. 14, 1919 |
| 1,548,394 | Sumner | Aug. 4, 1925 |
| 1,774,836 | Lormuller | Sept. 2, 1930 |
| 1,927,457 | Kapitza et al. | Sept. 19, 1933 |
| 1,997,807 | Bird | Apr. 16, 1935 |
| 2,057,707 | Carroll | Oct. 20, 1936 |
| 2,558,594 | Tritle | June 26, 1951 |
| 2,670,817 | Tripp | Mar. 2, 1954 |